United States Patent
Guo et al.

(10) Patent No.: US 9,632,259 B2
(45) Date of Patent: Apr. 25, 2017

(54) IDENTIFICATION CHIP HOLDING APPARATUS, OPTICAL FIBER SPLICING AND DISTRIBUTION MODULE, OPTICAL FIBER MANAGEMENT APPARATUS, AND METHOD FOR ASSEMBLING OPTICAL FIBER MANAGEMENT APPARATUS

(71) Applicant: Huawei Technologies Co., Ltd., Shenzhen, Guangdong (CN)

(72) Inventors: Mingsong Guo, Shanghai (CN); Jianjun Ma, Shenzhen (CN); Siwen Shu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/705,695

(22) Filed: May 6, 2015

(65) Prior Publication Data
US 2015/0234132 A1    Aug. 20, 2015

Related U.S. Application Data

(63) Continuation of application No. PCT/CN2013/086652, filed on Nov. 6, 2013.

(30) Foreign Application Priority Data

Nov. 7, 2012 (CN) .......................... 2012 1 0441049

(51) Int. Cl.
G02B 6/36 (2006.01)
G02B 6/38 (2006.01)
G02B 6/44 (2006.01)

(52) U.S. Cl.
CPC ......... *G02B 6/3895* (2013.01); *G02B 6/4452* (2013.01); *G02B 6/4454* (2013.01); *G02B 6/4479* (2013.01); *Y10T 29/49137* (2015.01)

(58) Field of Classification Search
USPC .................................................. 385/135–139
See application file for complete search history.

(56) References Cited

U.S. PATENT DOCUMENTS 5,419,717 A    5/1995  Abendschein et al.
7,458,517 B2   12/2008 Durrant et al.
(Continued)

FOREIGN PATENT DOCUMENTS

CN    101356464 A    1/2009
CN    101650457 A    2/2010
(Continued)

*Primary Examiner* — Eric Wong (57) ABSTRACT

The present invention relates to an identification holding apparatus, an optical fiber splicing and distribution module, an optical fiber management apparatus, and a method for assembling an optical fiber management apparatus. The optical fiber management apparatus includes the identification chip holding apparatus and the optical fiber splicing and distribution module, where a snap-on structure of the identification chip holding apparatus is fitted into an optical fiber connector, and a chip accommodating structure of the identification chip holding apparatus is installed in a hollow groove; and a chip in the chip accommodating structure implements external communication by using the chip accommodating structure and a printed circuit board. The optical fiber management apparatus in the embodiments of the present invention has good compatibility with a low cost and allows a convenient and quick operation of upgrading a common network to an intelligent network without interrupting a fiber-optic communication service.

11 Claims, 10 Drawing Sheets

(56) References Cited

U.S. PATENT DOCUMENTS

| | | | |
|---|---|---|---|
| 2004/0240807 A1 | 12/2004 | Frohlich et al. | |
| 2005/0231325 A1 | 10/2005 | Durrant et al. | |
| 2007/0116411 A1 | 5/2007 | Benton et al. | |
| 2011/0116748 A1 | 5/2011 | Smrha et al. | |
| 2011/0274437 A1* | 11/2011 | Jones | G02B 6/3895 |
| | | | 398/141 |
| 2014/0233902 A1* | 8/2014 | Ruiz | H04Q 1/136 |
| | | | 385/135 |
| 2015/0055928 A1* | 2/2015 | Yoshizaki | G02B 6/3849 |
| | | | 385/139 |

FOREIGN PATENT DOCUMENTS

| | | |
|---|---|---|
| CN | 101982797 A | 3/2011 |
| CN | 201845100 U | 5/2011 |
| WO | WO 02/097502 A1 | 12/2002 |
| WO | WO 2011/139938 A1 | 11/2011 |

* cited by examiner

IDENTIFICATION CHIP HOLDING APPARATUS, OPTICAL FIBER SPLICING AND DISTRIBUTION MODULE, OPTICAL FIBER MANAGEMENT APPARATUS, AND METHOD FOR ASSEMBLING OPTICAL FIBER MANAGEMENT APPARATUS

CROSS-REFERENCE TO RELATED APPLICATIONS

This application is a continuation of International Application No. PCT/CN2013/086652, filed on Nov. 6, 2013, which claims priority to Chinese Patent Application No. 201210441049.1, filed on Nov. 7, 2012, both of which are hereby incorporated by reference in their entireties.

TECHNICAL FIELD

The present invention relates to the field of optical fiber network management, and in particular, to an identification chip holding apparatus, an optical fiber splicing and distribution module, an optical fiber management apparatus, and a method for assembling an optical fiber management apparatus.

BACKGROUND

With development of communications technologies, optical fiber transmission is increasingly applied to a communications system, which inevitably increases difficulty in optical fiber management. Consequently, various kinds of technologies that facilitate optical fiber management, for example, adding a paper label to each connector or using a photoelectric composite cable, have emerged. However, a paper label is prone to damage and cannot implement intelligent management, while a photoelectric composite cable is expensive and cannot be used to resolve a problem of an optical fiber that has been laid.

Thereupon, a technology of adding an electronic label with a chip to an optical fiber connector emerges. The electronic label has two forms: radio frequency identification (RFID) and electronic identity (eID).

Figure 1:
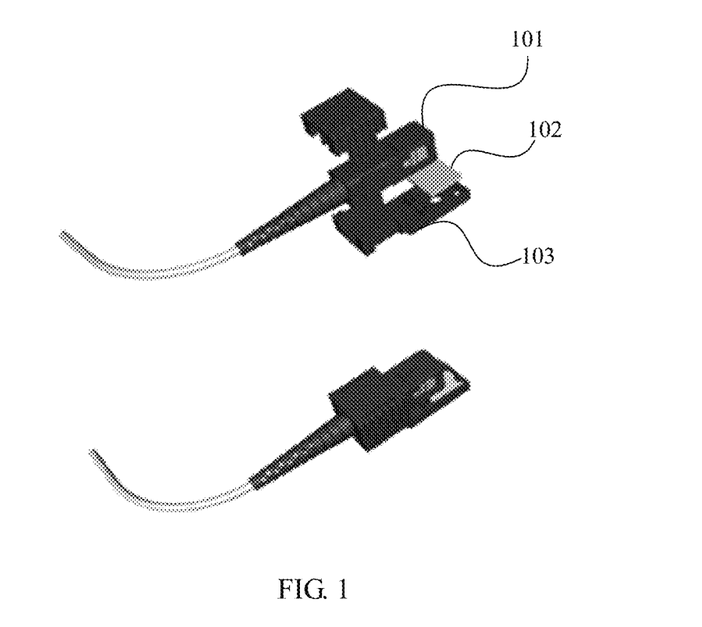
FIG. 1 is a schematic structural diagram of fitting an RFID chip into an optical fiber connector in the prior art.

FIG. 1 shows an implementation manner of an electronic label in an RFID form. As shown in FIG. 1, an RFID chip 102 is installed in the optical fiber connector 101 by using an upper and a lower latch 103, and then, the optical fiber connector 101 is connected to an optical fiber adapter so as to implement fiber-optic communication. The RFID chip 102 installed in a plug of the optical fiber connector 101 can store not only inherent optical fiber ID information but also all kinds of user information. When data in the RFID chip 102 is read, a printed circuit board (PCB) welded with an antenna is required to send information to an RFID reader. Disadvantages of this solution lie in technology complexity and high costs. Limited by transmit power, an access position of the RFID chip 102 is required to be very close to the antenna on the PCB, so that the latch 103 needs to be inserted under the optical fiber adapter. Therefore, during an installing process, it is required that the optical fiber connector 101 be removed first, the RFID chip 102 is installed by using the latch 103, and the optical fiber connector 101 is inserted back into the optical fiber adapter, so that the latch 103 with the RFID chip is inserted under the optical fiber adapter. In this way, online installation without service interruption cannot be implemented. An extra device is further required when the data is read, thereby increasing a cost. In addition, because the PCB is placed in a tray and there are flexible flat cables under an optical fiber in the tray, all the flexible flat cables need to be pulled out when the PCB is installed, which is very inconvenient for upgrading a common network to an intelligent network.

Figure 2:
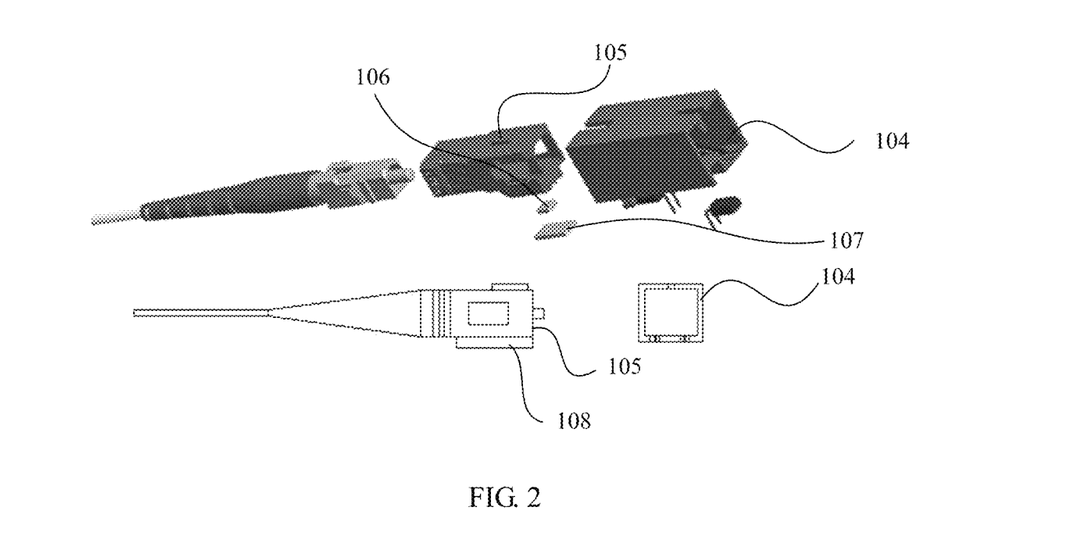
FIG. 2 is a schematic structural diagram of building an eID chip in an optical fiber connector in the prior art.

FIG. 2 is an existing implementation manner of an electronic label in an eID form. As shown in FIG. 2, a customized optical fiber adapter 104 and a customized optical fiber connector 105 are used in this solution, where a chip slot 108 is added in the optical fiber connector 105 to build an eID chip 106 in, the customized optical fiber adapter 104 is welded on a PCB 107, and then, the optical fiber connector 105 is inserted into the optical fiber adapter 104, so that a pin of the eID chip 106 is connected to the PCB 107 to implement that a signal of the eID chip 106 is read by an external device. Disadvantages of this solution lie in that the customized optical fiber adapter 104 is required to be welded on the PCB 107, and the customized optical fiber connector 105, in which a position is reserved for the chip slot 108 to build the eID 106 in, is required. As a result, an intelligent network that uses this method is incompatible with a common network and is costly. Therefore, a service needs to be interrupted during eID installation; otherwise, online installation cannot be implemented. In addition, because a PCB is welded with an adapter, the adapter cannot be replaced separately if the adapter is damaged.

SUMMARY

In order to resolve a problem in the prior art that a cost is high and upgrade installation cannot be performed without interrupting a service, the present invention provides an identification chip holding apparatus, an optical fiber splicing and distribution module, an optical fiber management apparatus, and a method for assembling an optical fiber management apparatus.

According to a first aspect, an embodiment of the present invention provides an identification chip holding apparatus, comprising:

a chip accommodating structure, configured to accommodate a chip that identifies an optical fiber connector, and implement an electrical connection between the chip and an external device; and a snap-on structure, configured to be accreted into the optical fiber connector.

According to a second aspect, an embodiment of the present invention provides an optical fiber splicing and distribution module, comprising:

a termination tray, wherein the termination tray has optical fiber adapter fastening positions, configured to fasten an optical fiber adapter, and under each fastening position is a hollow groove used to install a chip accommodating structure of an identification chip holding apparatus;

a printed circuit board (PCB), disposed under the optical fiber adapter fastening position, where an edge connector on the PCB is exposed from the hollow groove under the optical fiber adapter fastening position; and a bottom cover, which covers the PCB, so as to cover the back of the termination tray and envelop the PCB in the optical fiber splicing and distribution module.

According to a third aspect, an embodiment of the present invention provides an optical fiber management apparatus, wherein the optical fiber management apparatus includes an identification chip holding apparatus and an optical fiber splicing and distribution module;

a snap-on structure of the identification chip holding apparatus is fitted into an optical fiber connector, and a chip accommodating structure of the identification chip holding apparatus is installed in a hollow groove; and a chip in the chip accommodating structure implements external communication by using the chip accommodating structure and a circuit board.

According to a fourth aspect, an embodiment of the present invention provides a method for assembling an optical fiber management apparatus, which is used to assemble an optical fiber management apparatus and comprising:

opening a bottom cover on the back of an optical fiber splicing and distribution module, where the optical fiber splicing and distribution module includes a termination tray;

installing a printed circuit board (PCB) into a reserved position on the termination tray, and installing the bottom cover;

fitting a chip accommodating structure of an identification chip holding apparatus into a hollow groove of the optical fiber splicing and distribution module; and accreting a snap-on structure of the identification chip holding apparatus into an optical fiber connector.

An optical fiber management apparatus with optimal compatibility and a low cost is implemented by applying the identification chip holding apparatus, the optical fiber splicing and distribution module, the optical fiber management apparatus, and the method for assembling an optical fiber management apparatus provided by the embodiments of the present invention, so that an electronic label can be installed in an optical fiber network in a case that fiber-optic communication is not interrupted, thereby implementing an upgrade from a common network to an intelligent network.

DETAILED DESCRIPTION

The technical solutions of the present invention are further detailed below with reference to the accompanying drawings and embodiments.

According to the identification chip holding apparatus, the optical fiber splicing and distribution module, the optical fiber management apparatus, and the method for assembling an optical fiber management apparatus provided by the embodiments of the present invention, a method of fitting an identification chip holding apparatus is used to add a chip for identifying an optical fiber connector to the optical fiber connector, and an optical fiber splicing and distribution module added with a PCB is used for performing an electronic connection with the chip, so that electronic signal communication with an external device is implemented. This solution may be applied to a fiber-optic communication system, and in this solution, an optical fiber network device is added with an intelligent feature, such as identification and management of an optical fiber connection, or optical fiber intelligent indication, by using a chip that identifies an optical fiber connector; in addition, real-time interworking between an optical fiber network device and an inventory management system may be implemented by introducing a field tool, such as a Personal Digital Assistant (PDA).

Figure 3:
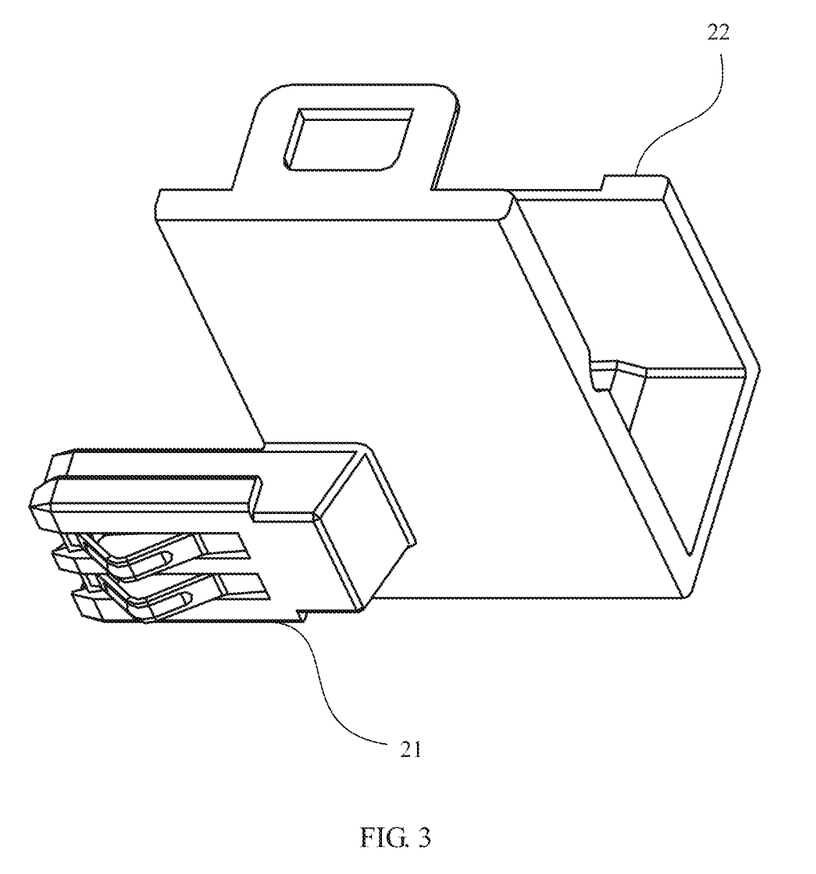
FIG. 3 is a schematic structural diagram of an identification chip holding apparatus according to an embodiment of the present invention.

FIG. 3 is a schematic structural diagram of an identification chip holding apparatus according to an embodiment of the present invention. The identification chip holding apparatus is made of plastic or, certainly, may be made of another material if needed, and an external structure of the identification chip holding apparatus is made integrally. According to different functions, the identification chip holding apparatus may be divided into a chip accommodating structure 21 and a snap-on structure 22. The chip accommodating structure 21 is configured to accommodate a chip (an eID chip is taken as an example in all the following embodiments) that identifies an optical fiber connector. The snap-on structure 22 may be accreted into the optical fiber connector and configured to install the chip accommodating structure 21 and an internal chip in the optical fiber connector. The foregoing chip has an electronic identification with a globally unique address. Fastened to the optical fiber connector, the chip may be configured to identify the optical fiber connector, so as to implement visual management and management accuracy of an optical fiber resource.

Figure 4:
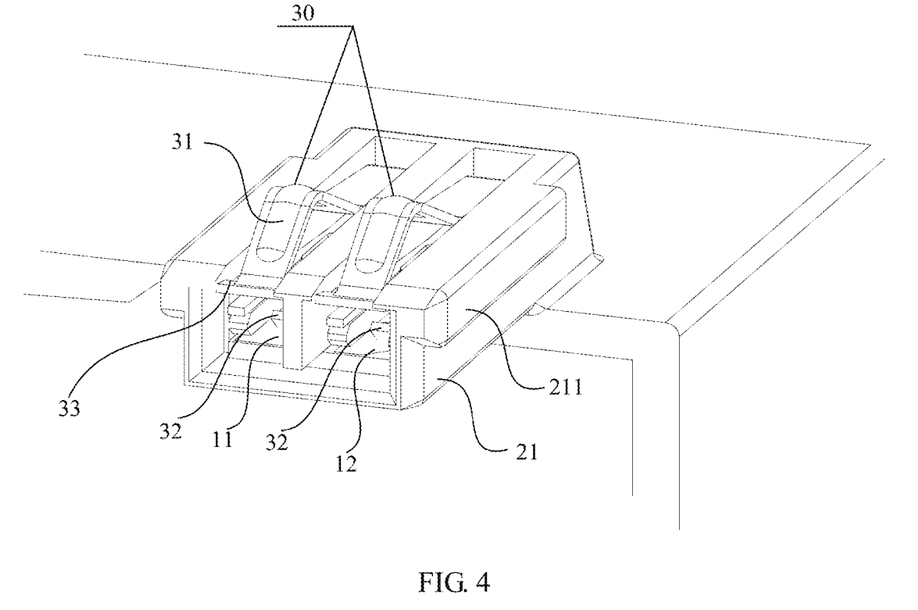
FIG. 4 is a schematic structural diagram of a chip accommodating structure of the identification chip holding apparatus shown in FIG. 3.

In an embodiment, a chip accommodating structure 21 includes an eID chip and two leaf springs 30. As shown in FIG. 4, the eID chip may have two chip pins, with one being a signal pin 11 and the other being a ground pin 12, and an area of a pin is, for example, 1.2×4.8 mm. It can be ensured, by using a pin designed with a big size, that the pin not only can be used for welding but also can read and write a signal through direct contact. The eID chip in the chip accommodating structure 21 may implement an electronic connection with an external device through direct contact with the leaf springs 30. The two leaf springs 30 in the chip accommodating structure 21 are identical, and each leaf spring 30 is divided into three parts: an upper leaf spring part 31, a lower leaf spring part 32, and a leaf-spring-warp-proof structure 33. The upper leaf spring part 31, the lower spring part 32, and the leaf-spring-warp-proof structure 33 may be made of metal integrally, and a joint between the upper leaf spring part 31 and the lower leaf spring part 32 and a joint between the upper leaf spring part 31 and the leaf-spring-warp-proof structure 33 has a bending structure each, where the bending structure enables the leaf springs 30 to have a characteristic of springiness. The lower leaf spring parts 32 of the two leaf springs 30 come in contact with the signal pin 11 and the ground pin 12 of the two chip pins of the eID chip respectively and are pressed tightly on the two pins of the eID chip; and the upper leaf spring parts 31 of the two leaf springs 30 bend in the middle and protrude out of the chip accommodating structure 21, where the middle bending parts are configured to, through contact with an external device (which is described in detail below), perform the electronic connection so as to transmit information in the eID chip. The leaf-spring-warp-proof structure 33 is located on the top of a leaf spring 30. Metal of the leaf-spring-warp-proof structure 33 is wider than that of the upper leaf spring 31 and that of the lower leaf spring 32, for example, an overall width of the metal of a leaf spring 30 is 1 mm and the width of the metal of the leaf-spring-warp-proof structure 33 is 1.5 mm, where the leaf-spring-warp-proof structure 33 is disposed and installed in the plastic material, which certainly may be another material, of the chip accommodating structure 21. By using this structure design, not only normal spring deformation of the leaf springs 30 can be ensured, but also it can be ensured that the springs are placed in the chip accommodating structure 21 all the time and are not damaged during insertion or removal. A positioning rib 211 may further be disposed outside the chip accommodating structure 21, which may ensure that when an optical fiber splicing and distribution module (which is described in detail below) is inserted into the identification chip holding apparatus 20, the identification chip holding apparatus 20 can be positioned precisely.

In another embodiment, a leaf spring is disposed in an external device. The leaf spring includes an upper leaf spring part and a lower leaf spring part, where the upper spring part may connect to the external device in a manner of being welding on a PCB. When a chip accommodating structure 21 is installed in the external device, the lower leaf spring comes in contact with a pin of an eID chip and is pressed tightly, so as to implement an electronic connection between the eID chip and the external device.

Figure 5:
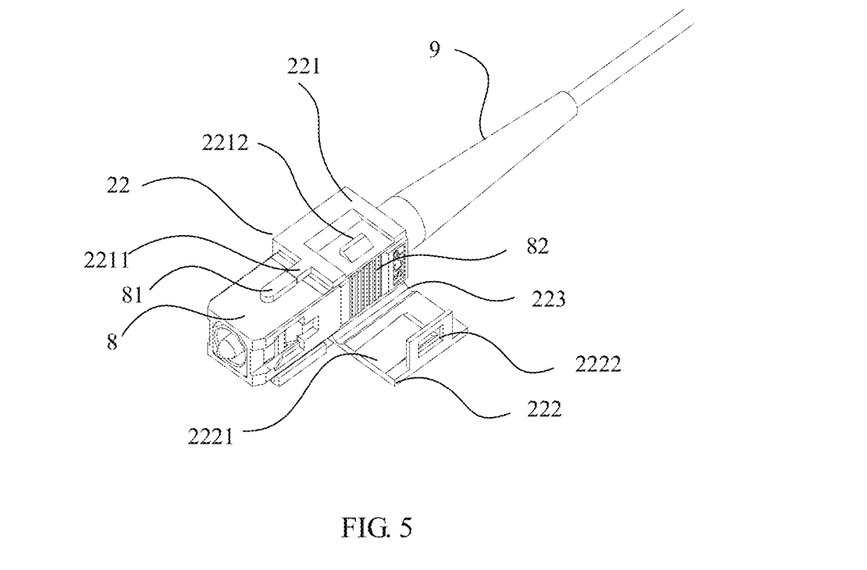
FIG. 5 is a schematic diagram of installing a snap-on structure of the identification chip holding apparatus shown in FIG. 3 in an optical fiber connector.

A snap-on structure 22 has an openable hollow sleeve-like structure and may be accreted into an optical fiber connector 8, so that the chip accommodating structure 21, which connects to the snap-on structure 22 integrally, and the eID chip that is accommodated in the chip accommodating structure 21 are fastened in the optical fiber connector 8. In an embodiment, as shown in FIG. 5, the front end of a snap-fit surface 221 of a snap-on structure 22 may have a front-positioning component 2211. When the snap-on structure 22 is accreted into an optical fiber connector 8, the front-positioning component 2211 is aligned with a convex component 81 in the optical fiber connector 8, so as to indicate an installation position. On the snap-fit surface 221 may further be a snap-fit convex part 2212 that fits into a slot 2222 in a fold-up structure 222. After the fitting, the snap-on structure 22 forms a hollow cuboid and is accreted into the optical fiber connector 8. On the fold-up structure 222 may further be a rear-positioning structure 2221 that comes in contact with a handshake slope 82 of the optical fiber connector 8 and is configured to fasten the optical fiber connector 8 and the snap-on structure 22 closely. On a moveable fold-up part is a slope groove 223 that is convenient for folding and fitting of the snap-on structure 22.

When the fold-up structure 222 of the snap-on structure 22 of an identification chip holding apparatus 20 is in an unfolded state, the snap-on structure 22 is accreted into the optical fiber connector from the direction of an optical fiber 9. After the front-positioning component 2211 is aligned with the convex component 81 and comes in contact with the convex component 81, the snap-fit convex part 2212 on the snap-fit surface 221 is fitted into the slot 2222 in the fold-up structure 222. At this time, close contact between the handshake slope 82 of the optical fiber connector 8 and the rear-positioning structure 2221 is implemented, so that the identification chip holding apparatus 20 is fastened on the optical fiber connector 8. In this case, the optical fiber 9 that connects to the optical fiber connector 8 is an intelligent fiber with an eID.

In a manner of accreting the identification chip holding apparatus 20 into the optical fiber connector 8, it is implemented that an intelligent upgrade of the optical fiber 9 can be completed without replacing the optical fiber connector 8.

An electronic signal of an eID chip in the optical fiber connector 8 is transmitted to an external device through contact between a chip pin and a leaf spring 30, and an optical path part of the optical fiber 9 is completely separated from a circuit part. If the optical path part (namely, the optical fiber 9) is damaged, only the optical fiber 9 needs to be replaced, while the eID chip 10 of the circuit part may be removed as the identification chip holding apparatus 20 is opened, and may be re-installed in the optical fiber connector 8 with a new optical fiber 9 after the optical path is replaced. Similarly, if the circuit part in the identification chip holding apparatus 20 is damaged, only the identification chip holding apparatus 20 needs to be removed and replaced.

Figure 6:
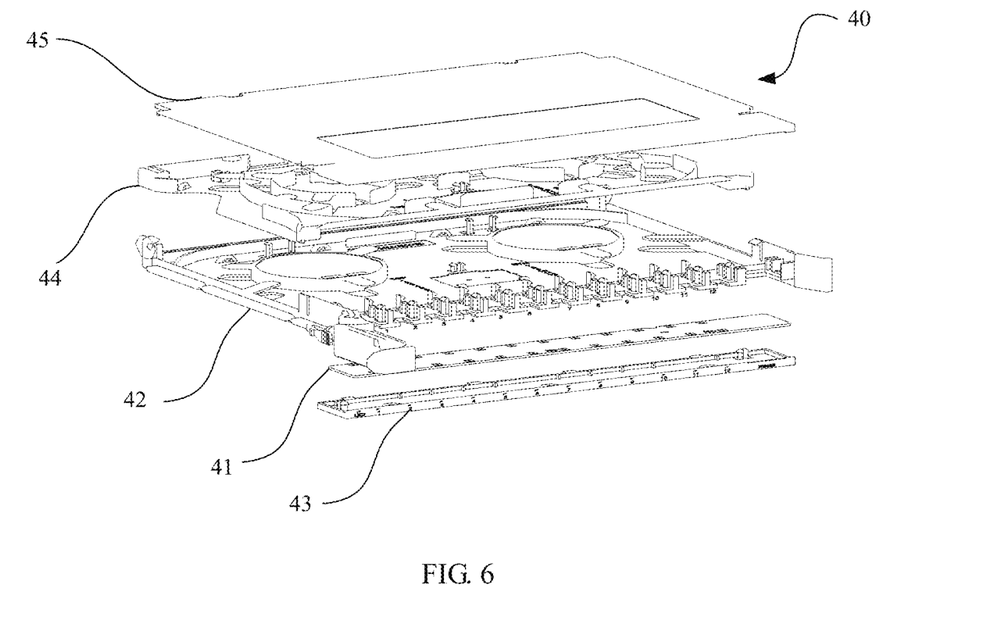
FIG. 6 is an exploded view of an optical fiber splicing and distribution module according to an embodiment of the present invention.

FIG. 6 is an exploded view of an optical fiber splicing and distribution module according to an embodiment of the present invention. The optical fiber splicing and distribution module 40 mainly includes a PCB 41, a termination tray 42, and a bottom cover 43. In addition, the optical fiber splicing and distribution module 40 further includes a splice tray 44 and a cover plate 45.

Figure 7:
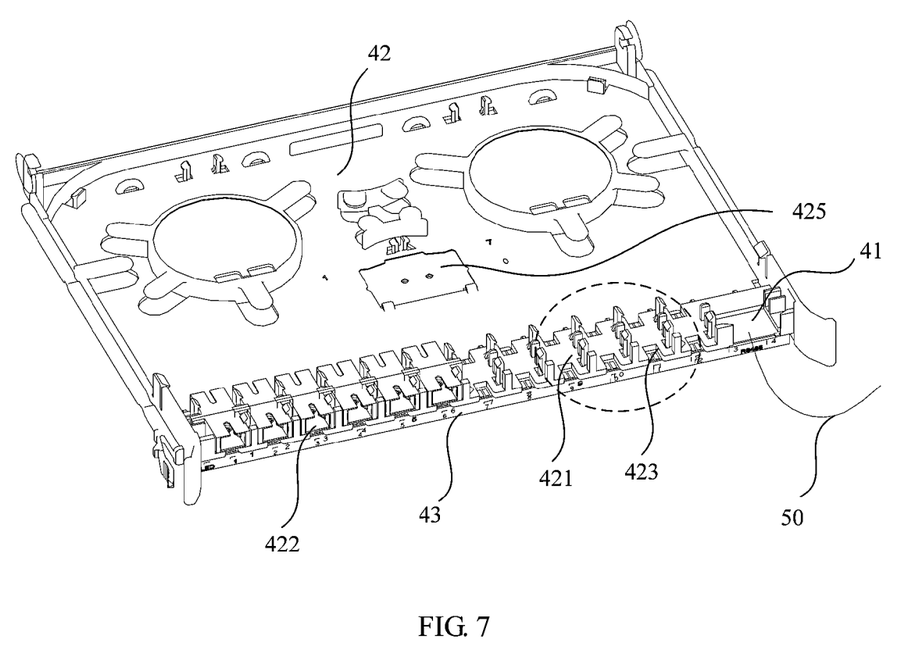
FIG. 7 is a schematic structural diagram of a termination tray, a PCB, and a bottom cover of the optical fiber splicing and distribution module shown in FIG. 6.

FIG. 7 shows a schematic structural diagram of the termination tray 42, the PCB 41, and the bottom cover 43 of the optical fiber splicing and distribution module 40 shown in FIG. 6.

Figure 8:
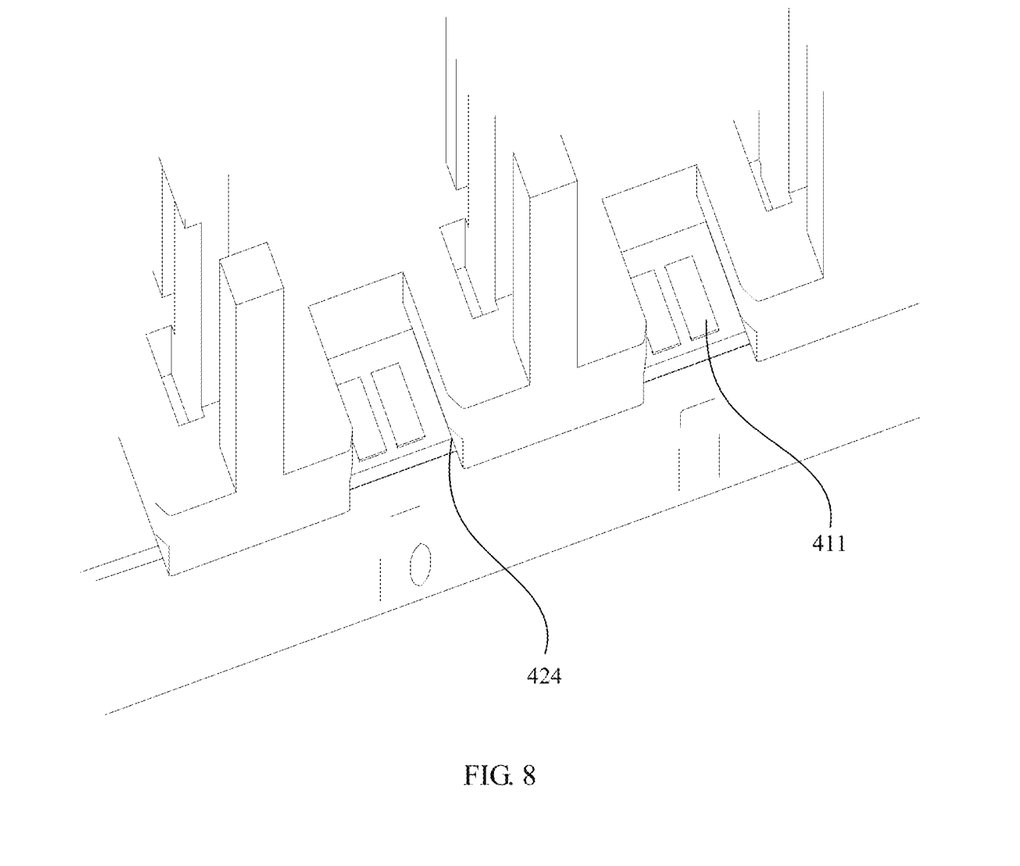
FIG. 8 is an enlarged view of a part of FIG. 7.

In an embodiment, as shown in FIG. 7, on the termination tray 42 are 12 optical fiber adapter fastening positions 421 in which 12 optical fiber adapters 422 may be installed. In an edge of each optical fiber adapter fastening position 421 is a hollow groove 423 used for installing a chip accommodating structure 21 of an identification chip holding apparatus 20. A pilot hole 424 may further be disposed on a side of each hollow groove 423. As shown in FIG. 8, a shape and a structure of the pilot hole 424 match a shape and a structure of a positioning rib 211 that is on the outside of the chip accommodating structure 21. When the chip accommodating structure 21 is inserted into the hollow groove 423, the positioning rib 211 is fitted into the pilot hole 424, so that the identification chip holding apparatus 20 is pressed on the PCB 41 tightly and precisely.

An extensible base 425 may further be disposed on the termination tray 42, where the extensible base 425 may extend a splice end of an optical fiber to 24 cores, and install 24 optical fiber adapters 422 to satisfy a need of a dual-Lucent Connector (LC).

The PCB 41 is disposed under the optical fiber adapter fastening positions 421. On the PCB 41 is a circuit structure that connects to a serial bus 50, and an edge connector 411 that is used as a contact for an electronic connection, where the edge connector 411 is exposed from the hollow groove 423 on the edge of the optical fiber adapter fastening position 421. In an example, the edge connector 411 are two metal electrode contacts that come in contact with two leaf springs 30 in the chip accommodating structure 21 that is installed in the hollow groove 423 respectively, where one electrode contact connects to a single pin 11 of an eID chip by using one leaf spring 30 and transmits information in the eID chip to the serial bus 50 by using the PCB 41, and the other electrode contact connects to a ground pin 12 of the eID chip by using the other leaf spring 30 to make potential of the eID chip to be 0.

The bottom cover 43 is located on the back of the optical fiber splice and covers the PCB 41 after the PCB 41 is disposed on the optical fiber splicing and distribution module 40, so as to cover the back of the termination tray 42 and envelop the PCB 41 in the optical fiber splicing and distribution module.

The PCB 41 of the optical fiber splicing and distribution module 40 connects to the serial bus 50 to transmit information to an external communications system.

An optical path part and a circuit part on the optical fiber splicing and distribution module 40 are completely separated from each other. If the optical path part (namely, the optical fiber adapter 422 and an optical fiber part connected to the optical fiber adapter 422) is damaged, only the optical path part needs to be replaced. If the PCB 41 of the circuit part is faulty, the circuit part may be removed as the bottom cover 43 is opened and may be re-installed in the optical fiber splicing and distribution module 40 with a new PCB 41.

Figure 9:
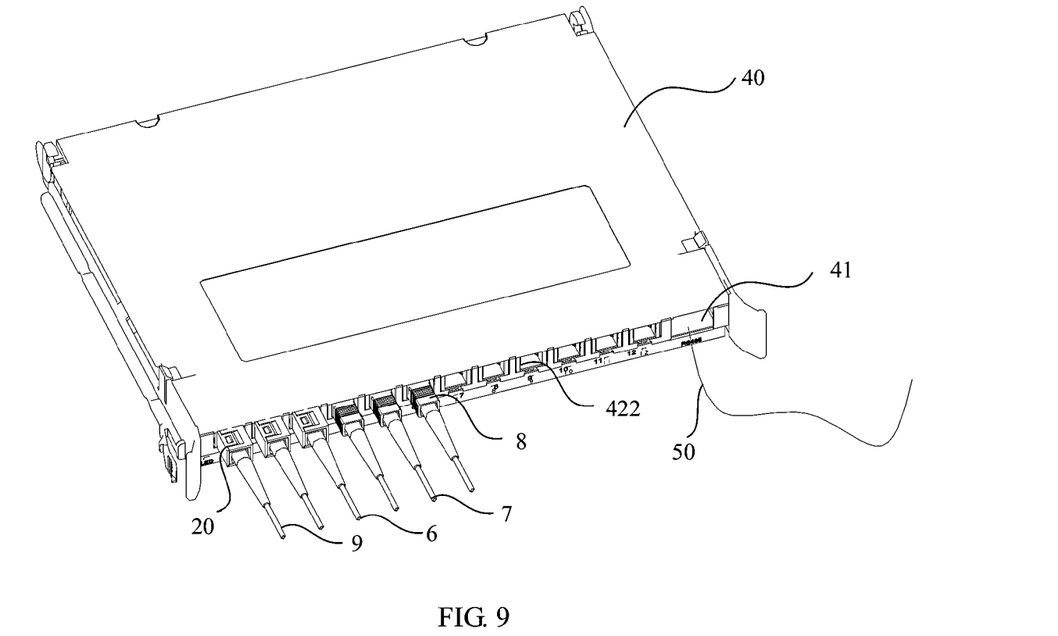
FIG. 9 is a schematic diagram of an optical fiber management apparatus according to an embodiment of the present invention.

FIG. 9 is a schematic diagram of an optical fiber management apparatus according to an embodiment of the present invention. The optical fiber management apparatus includes the optical fiber splicing and distribution module 40 and the identification chip holding apparatus 20 provided by the foregoing embodiments.

An optical fiber 9 is installed in an optical fiber adapter 422 of the optical fiber splicing and distribution module 40 by using an optical fiber connector 8, so that an optical path communication connection between the optical fiber 9 and the optical fiber splicing and distribution module 40 is implemented.

The identification chip holding apparatus 20 is fitted into the optical fiber connector 8. In this case, a chip accommodating structure 21 of the identification chip holding apparatus 20 is installed in a hollow groove 423 under the optical fiber adapter 422, the chip accommodating structure 21 is pressed on a PCB 41 tightly and precisely by inserting and firmly fitting a positioning rib 211 into a pilot hole 424. At this time, an edge connector 411 of the PCB 41 is tightly pressed by a leaf spring 30 in the identification chip holding apparatus 20.

Figure 10:
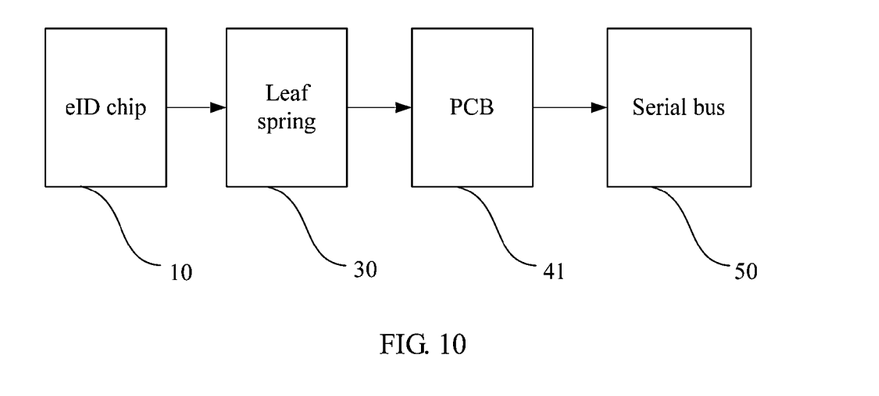
FIG. 10 is an architecture diagram for electronic signal transmission of an optical fiber management apparatus according to an embodiment of the present invention.

A schematic diagram of signal transmission of an electronic connection of an optical fiber management apparatus is shown in FIG. 10. A signal of an eID chip 10 establishes a connection with an external communications system by using a leaf spring 30, a PCB 41, and a serial bus 50 connecting to the PCB 41.

Figure 11:
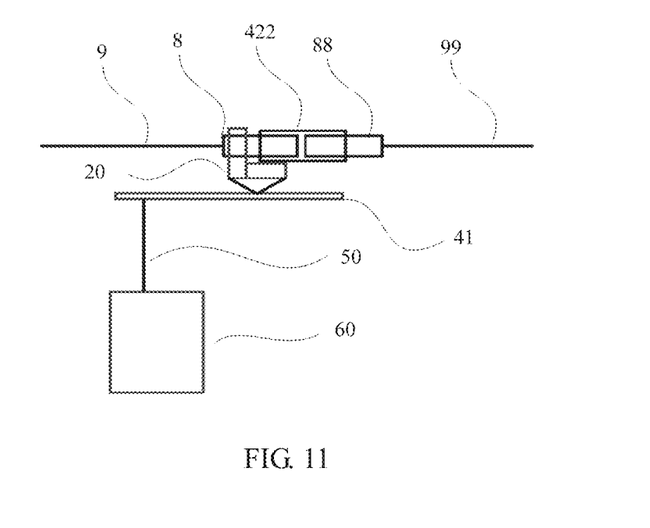
FIG. 11 is a schematic diagram of signal transmission of an optical fiber management apparatus according to an embodiment of the present invention.

As shown in FIG. 11, an optical signal is transmitted through an optical fiber 9 and an optical fiber 99 respectively connecting to an optical fiber connector 8 and an optical fiber connector 88 at both ends of an optical fiber adapter 422; and an electronic signal is transmitted by using the identification chip holding apparatus 20, the PCB 41, and the serial bus 50. In an embodiment, when an optical fiber system needs to be maintained, for example, fiber-optic communication of an interface is interrupted, an external network management system 60 generates a signal, where the signal is transmitted to the PCB 41 through the serial bus 50, and the PCB 41 finds a corresponding interface according to information in the eID chip accommodated in the identification chip holding apparatus 20 that connects to the PCB 41. When the optical fiber connector 8 is removed from the interface, the identification chip holding apparatus 20 accreted into the optical fiber connector 8 is also removed from an optical fiber splicing and distribution module, an electronic connection between the eID chip accommodated in the identification chip holding apparatus 20 and the PCB 41 is interrupted, and the PCB 41 sends a signal to the external network management system 60 through the serial bus 50 to report that the fiber-optic communication of the interface is interrupted. In another embodiment, when an optical fiber system needs to be maintained, for example, fiber-optic communication of an interface is accessed, an electronic connection between the eID chip accommodated in the identification chip apparatus 20 and the PCB 41 is established with a connection between the optical fiber connector 8 and the optical fiber adapter 422. Information in the eID chip is transmitted to the network management system 60 through the PCB 41 and the serial bus 50, and the network management system 60 verifies received information to determine whether an optical fiber connection is correct. If the optical fiber connection is incorrect, the network management system 60 sends information to the PCB 41 to inform the PCB 41 of a connection error by using an LED.

Each end-to-end link can be marked, displayed, and managed conveniently in a network management system by using an optical fiber manage management apparatus, so that it is easy to install and maintain an fiber-optic communication device.

In addition, in an optical fiber network system with an optical fiber management apparatus, an optical fiber for which no optical fiber management apparatus is installed can be compatible with as well. As shown in FIG. 9, both an optical fiber 6 connected to an optical fiber connector 8 in which an identification chip holding apparatus 20 is installed and an optical fiber 7 connected to an optical fiber connector 8 in which no identification chip holding apparatus 20 is installed can connect to an optical fiber splicing and distribution module 40 in which a PCB 41 is installed, where the two optical fibers use two identical optical fiber connectors 8 and connect to two identical optical fiber adapters 422. Therefore, applicability of the optical fiber management apparatus is greatly enhanced, and compatibility between a common network and an intelligent network is implemented easily.

Finally, an embodiment of the present invention provides a method for assembling an optical fiber management apparatus, that is, a method for upgrading a traditional optical fiber network to an intelligent optical fiber network by applying an optical fiber management apparatus.

The following uses an upgrade performed on an existing traditional optical fiber network that is running as an example for description.

Figure 12:
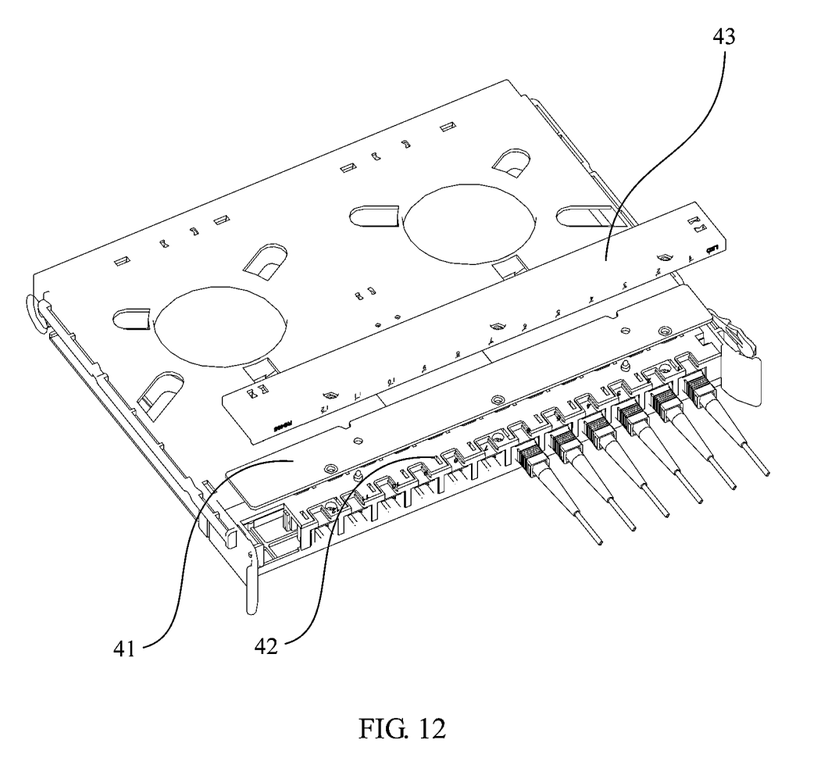
FIG. 12 is one schematic diagram of a method for assembling an optical fiber management apparatus according to an embodiment of the present invention.

Firstly, as shown in FIG. 12, a bottom cover 43 on the back of an optical fiber splicing and distribution module in the traditional optical fiber network is opened, and the bottom of a termination tray 42 is exposed. A PCB 41 is installed into a reserved position on the termination tray 42, and after the installation, the bottom cover 43 is installed. An upgrade of the optical fiber splicing and distribution module is complete.

Figure 13:
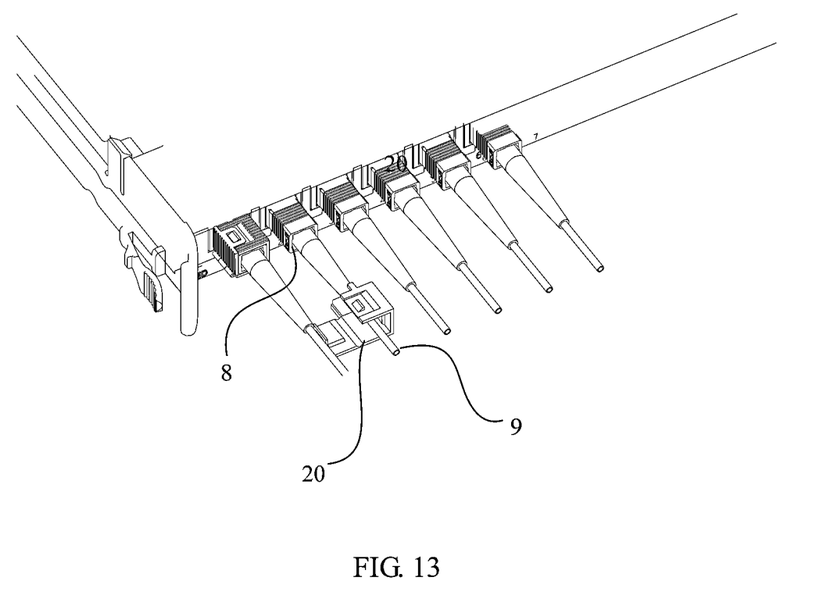
FIG. 13 is another schematic diagram of a method for assembling an optical fiber management apparatus according to an embodiment of the present invention.

Secondly, as shown in FIG. 13, the identification chip holding apparatus 20 that is in an unfolded state is accreted into the optical fiber connector from the direction of an optical fiber, a chip accommodating structure of the identification chip holding apparatus 20 is fitted into the PCB 41 of the optical fiber splicing and distribution module, and then, a snap-on structure of the identification chip holding apparatus 20 is accreted into the optical fiber connector 8 and a latch is buckled. An upgrade of the optical fiber connector 8 is complete.

In this case, a pin of an eID chip that identifies the optical fiber connector and is accommodated in the chip accommodating structure come in contact with an edge connector of the PCB 41 by using a leaf spring, so that an electronic connection with an external communications system is implemented.

A common optical fiber network is upgraded to an intelligent optical fiber network with an eID chip by performing the foregoing steps. Only a PCB and an identification chip holding apparatus with an eID chip need to be added during the upgrade, thereby reducing a cost effectively. In addition, normal fiber-optic communication is not affected by using a manner of accreting an identification chip holding apparatus and installing an eID chip, so that a network is upgraded in a case that the fiber-optic communication is not interrupted.

In addition, when the PCB 41 is damaged and device maintenance is required, it is only required to unfasten the bottom cover 43, remove the PCB 41, replaced the PCB 41 with a new one, and re-install the bottom cover 43. The maintenance process is easy and does not affect working of an optical path, so that a communication service of an optical fiber system does not need to be interrupted.

When the eID is damaged and needs to be replaced, it is only required to open the identification chip holding apparatus 20, remove it from the optical fiber adapter to the direction of an optical fiber, and install a new identification chip holding apparatus 20 with a new eID chip. Neither does the maintenance process affect a communication service of an optical fiber system.

A person skilled in the art should further note that, the optical fiber management apparatus and the chip accommodating structure in the present invention may further be configured to accommodate, besides an eID chip, another chip used for optical fiber identification, such as an RFID. A person skilled in the art may make slight changes to the exemplary apparatus and methods described by the disclosed embodiments of this specification to implement the described functions, but it should not be considered that the implementation goes beyond the scope of the embodiments of the present invention.

The foregoing specific embodiments clarify the objective, technical solutions, and benefits of the present invention in detail. It should be understood that the foregoing descriptions are merely specific embodiments of the present invention, but are not intended to limit the protection scope of the present invention. Any modification, equivalent replacement, or improvement made without departing from the spirit and principle of the present invention should fall within the protection scope of the present invention.

What is claimed is:

1. An identification chip holding apparatus, comprising:
   a chip accommodating structure, configured to accommodate a chip that identifies an optical fiber connector, and implement an electrical connection between the chip and an external device; and
   a snap-on structure, configured to be accreted into the optical fiber connector;
   wherein the snap-on structure has a fold-up structure;
   wherein the snap-on structure has a snap-fit convex part, configured to fit into a slot on the fold-up structure; and
   wherein the fold-up structure further has a rear-positioning structure, configured to come in contact with a handshake slope of the optical fiber connector, so as to fasten the identification chip holding apparatus.

2. The identification chip holding apparatus according to claim 1, wherein the chip accommodating structure and the snap-on structure are made of plastic integrally.

3. The identification chip holding apparatus according to claim 1, wherein the chip accommodating structure comprises a metal leaf spring, configured to implement the electrical connection between the chip and the external device.

4. The identification chip holding apparatus according to claim 3, wherein:
   the metal leaf spring comprises an upper leaf spring part and a lower leaf spring part;
   the external device comprises a printed circuit board (PCB);
   the chip comprises an electronic identity (eID) chip; and
   the upper leaf spring part and the lower leaf spring part are connected integrally, the lower leaf spring part of the metal leaf spring comes in contact with a chip pin of the eID chip, and the upper leaf spring part comes in contact with an edge connector of the PCB.

5. The identification chip holding apparatus according to claim 4, wherein two chip pins of the eID chip have an extended area.

6. The identification chip holding apparatus according to claim 3, wherein the metal leaf spring has a bending structure.

7. The identification chip holding apparatus according to claim 4, wherein the top of the upper leaf spring part has a leaf-spring-warp-proof structure.

8. The identification chip holding apparatus according to claim 7, wherein the leaf-spring-warp-proof structure is a metal leaf spring with a widened top, and is configured to fasten the top of the metal leaf spring in a slot of the snap-on structure.

9. The identification chip holding apparatus according to claim 1, wherein the snap-on structure is an openable hollow sleeve-like structure and is configured to fit into the optical fiber connector.

10. The identification chip holding apparatus according to claim 1, wherein the snap-on structure has a front-positioning component, configured to interconnect with a convex component of an optical fiber connector and indicate an installation position of the identification chip holding apparatus.

11. An optical fiber management apparatus, comprising:
    an identification chip holding apparatus comprising,
       a chip accommodating structure, configured to accommodate a chip that identifies an optical fiber connector, and implement an electrical connection between the chip and an external device, and
       a snap-on structure, configured to be accreted into the optical fiber connector;
    wherein the snap-on structure has a fold-up structure;
    wherein the snap-on structure has a snap-fit convex part, configured to fit into a slot on the fold-up structure; and wherein the fold-up structure further has a rear-positioning structure, configured to come in contact with a handshake slope of the optical fiber connector, so as to fasten the identification chip holding apparatus;

an optical fiber splicing and distribution module, comprising,
- a termination tray having optical fiber adapter fastening positions, configured to fasten an optical fiber adapter, and under each fastening position is a hollow groove used to install a chip accommodating structure of an identification chip holding apparatus,
- a printed circuit board (PCB), disposed under the optical fiber adapter fastening position, wherein an edge connector on the PCB is exposed from the hollow groove under the optical fiber adapter fastening position, and
- a bottom cover, which covers the PCB, so as to cover the back of the termination tray and envelop the PCB in the optical fiber splicing and distribution module;

wherein the snap-on structure of the identification chip holding apparatus is fitted into an optical fiber connector, and the chip accommodating structure of the identification chip holding apparatus is installed in a hollow groove; and wherein a chip in the chip accommodating structure implements external communication by using the chip accommodating structure and the printed circuit board (PCB).

* * * * *